United States Patent
Kelly et al.

[11] Patent Number: 5,756,232
[45] Date of Patent: May 26, 1998

[54] IMPROVED LITHIUM METAL ANODES

[75] Inventors: Charles J. Kelly, Rockledge; David L. Chua, Wayne, both of Pa.

[73] Assignee: Alliant Techsystems Inc., Hopkins, Minn.

[21] Appl. No.: 719,992

[22] Filed: Sep. 25, 1996

[51] Int. Cl.[6] .............. H01M 4/70; H01M 4/62
[52] U.S. Cl. .................. 429/232; 429/241; 429/245
[58] Field of Search .................. 429/94, 223, 233, 429/241, 165, 232, 245

[56] References Cited

U.S. PATENT DOCUMENTS

| | | | |
|---|---|---|---|
| 4,615,959 | 10/1986 | Hayashi et al. | 429/232 |
| 4,622,277 | 11/1986 | Bedder et al. | 429/96 |
| 5,292,601 | 3/1994 | Sugeno et al. | 429/197 |
| 5,387,479 | 2/1995 | Koksbang | 429/126 |
| 5,503,946 | 4/1996 | Fauteux et al. | 429/232 |
| 5,541,022 | 7/1996 | Mizumoto et al. | 429/232 |
| 5,612,153 | 3/1997 | Moulton et al. | 429/191 |

FOREIGN PATENT DOCUMENTS 0 634 805 A1  1/1995  European Pat. Off.

*Primary Examiner*—Prince Willis, Jr.
*Assistant Examiner*—Carol Chaney
*Attorney, Agent, or Firm*—Haugen and Nikolai, P.A.

[57] ABSTRACT

An improved anode for use in non-aqueous active metal secondary cells include a substrate current collector, a layer of active metal anode material on said current collector and a relatively narrow peripheral band of material capable of accepting reversible insertion of the active metal for capturing dendrite material formed in charging the anode on said current collector surrounding said layer of active metal anode material.

19 Claims, 1 Drawing Sheet

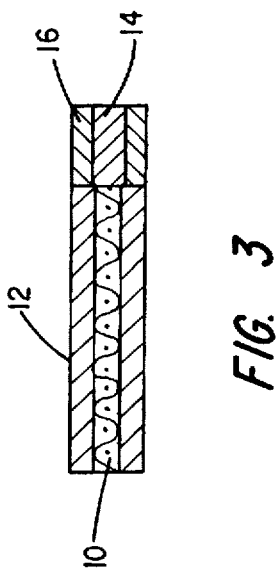
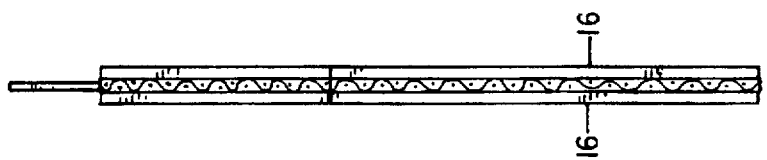
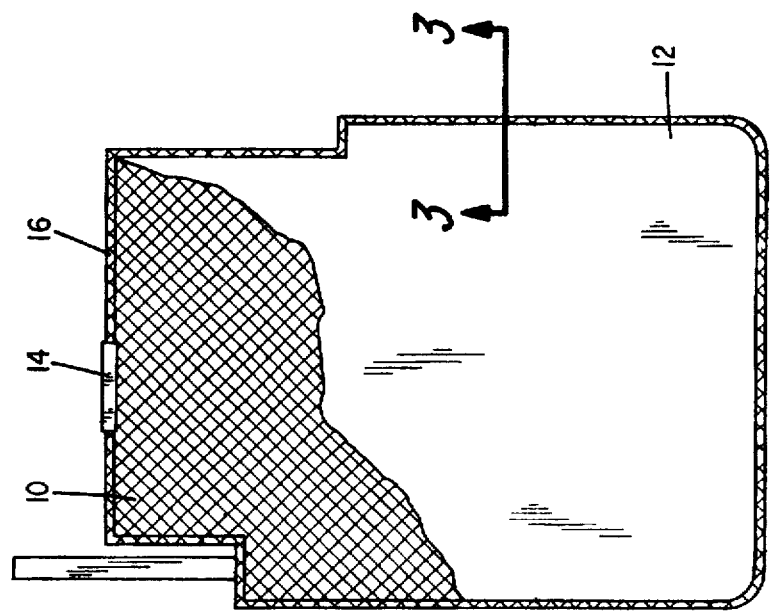
FIG. 1
FIG. 2
FIG. 3

IMPROVED LITHIUM METAL ANODES

The invention was made with Government support under Contract No. N60921-93-C-0060 awarded by the Department of the Navy. Accordingly, the Government has certain rights in the invention.

BACKGROUND OF THE INVENTION

I. Field Of The Invention

The present invention is directed generally to secondary, non-aqueous electrochemical cells or batteries using active metal, usually lithium as the anode in combination with chargeable metal oxide cathode materials. More particularly, the invention is directed to an improved lithium metal anode which prevents the unwanted accumulation of dendritic crystalline material during the course of the charge cycle.

II. Discussion Of The Related Art

Lithium metal anodes in secondary or rechargeable cells are generally quite thin and planar in nature, or in roll form, typically using lithium foil, or the like, as the active material pressed into a current collecting substrate. These anodes are subject to uneven plating and enlargement at the edges during the charge half cycles. Thus, when the anodes are subjected to charge and discharge cycles, the amounts of metallic lithium are likely to electrodeposit onto the current collecting substrate as a powder material which then converts into a dendrite-shaped crystalline form during the course of the charge cycle. These dendrite crystals are highly conductive, relatively sharp, hard deposits and the material is of sufficient strength to penetrate even the strongest, conventional separator material or to form through the fine holes or interstices in fabric separator structures and, upon reaching the positive electrode or cathode, creating short circuit paths between anode and cathode plates. This, of course, severely reduces or restricts the charge and discharge cycle life of the cell or battery. In addition, because the plated metallic lithium is also extremely reactive, a safety problem may also be created.

Certain approaches have been used to prevent or reduce the dendrite formation phenomenon in non-aqueous cells of the class. In one such approach, the lithium negative electrodes are replaced by a carbonaceous material susceptible of doping and un-doping lithium in combination with lithium containing metal complex oxide cathodes. The doping and un-doping of lithium in the carbonaceous material during the charge and discharge half cycles greatly reduces dendrite formation. Such a system is illustrated and described in U.S. Pat. No. 5 292 601 to Sugeno et al., in which dendrite growth is inhibited by the use of lithium in the form of a carbon-lithium intercalation compound for the negative electrode. A system using a carbonaceous anode in a rechargeable lithium system is also described in European Patent Application 0 634 805 A1, published Jun. 23, 1994.

While the above-mentioned approaches to remedying the problem of dendrite formation in rechargeable lithium anodes have met with some success, they represent a radical change in construction of the anode which generally may not be desirable. In the case of flat or thin sheet anode configuration, the plating inefficiencies of the lithium metal anodes during charge/discharge cycling, for the most part, result in lithium dendrite plating which is generally limited to the electrode periphery or plate edges. Thus, it would be advantageous if the problem could be alleviated by an approach which deals directly with the problem of dendrite formation along the anode edges rather than completely replacing the anode material.

One prior solution to the problem was to construct the anode electrode plates to be slightly larger than the cathode electrode plates thereby creating offsets between the edges of the interfacing anode and cathode to make dendrite bridging shorts more difficult. However, this approach did not lessen dendrite formation itself, and so has had limited success. Furthermore, all the lithium material plated in that manner becomes passivated and is no longer useful in the cell and this reduces cell capacity.

Accordingly, there remains a need for dealing with the problem of lithium dendrite plating at electrode edges which does not require changing the nature of the electrode itself. It would be particularly advantageous if the dendrite plating were eliminated so that both shorting and loss of capacity were avoided.

It is a primary object of the present invention to provide a non-aqueous secondary electrochemical cell or battery having a lithium anode which does not suffer from dendrite plating at the electrode plate edges.

It is another object of the invention to provide a non-aqueous secondary electrochemical cell or battery which uses a lithium anode and achieves good cycle life.

It is a further object of the invention to provide an improved lithium anode structure for a non-aqueous secondary cell or battery with associated sites for highly conductive dendritic material to be deposited in a manner which allows it to be reversibly inserted into the depth of the sites eliminating an uneven buildup of material on the anode edge surfaces and preserving that lithium in an active state available to the cell in ensuing cycles.

Other objects and advantages of the invention will become apparent in gaining a familiarity with the specification and associated drawings contained herein.

SUMMARY OF THE INVENTION

Problems associated with dendrite edge shorts and decreased cycle life of non-aqueous secondary electrochemical cells or batteries utilizing lithium anodes are solved by the provision of an improved lithium anode structure in which the lithium anode material is encased in a relatively narrow frame of material capable of accepting reversible insertion of lithium located about the anode plate edges which encourages dendritic material to insert into the depth of the frame eliminating an uneven buildup of material on the anode surfaces and preserving the availability of the lithium. The remainder of the anode may be fabricated of lithium metal and the intercalation of the lithium material into and out of the frame can be repeated with every cycle without surface buildup thereby extending the cycle life of the subject cells or batteries.

The frame may be constructed of any suitable dendrite receptor material of which the best examples are carbonaceous materials. The preferred material is a carbonaceous material and success has been achieved using graphite material that is applied as a thin graphite coating confined to a narrow perimeter region on the edges of each anode plate. The coating is applied to a frame edge substrate of metal or other material suitable for supporting a continuous coating or deposit of graphite. The substrate may be an integral part of the anode plate current collector. The current collector is generally in the form of a grid of metal, either electrochemically formed, perforated or acid etched or of a mechanically expanded metal or woven mesh design. If the current collector is utilized as the graphite substrate, the peripheral edge of the substrate is left as unperforated or unexpended metal to provide continuous support for a band of carbonaceous material which surrounds the anode metal.

The applied carbonaceous material band or trim is preferably prepared as a composition of finely divided material such as graphite, generally greater than 2 microns and up to about 128 microns average particle size. One successful embodiment used a particle size averaging 44 microns. A binder, in the order of about 5 weight percent of the carbonaceous material, of Kynar 461, available from Elf Autochem, is used. A solvent including methyl sulfoxide or other material capable of wetting the graphite or other carbonaceous material is added equal to a weight percent approximating 350 percent of the carbonaceous material/binder mix. The carbonaceous material coating may be applied in a plurality of sequential layers, if desired, to produce a coating of sufficient thickness after solvent of evaporation and drying. After solvent evaporation, the material is then oven dried at 150° C. for 4 hours or more to remove the plasticizer such that substantially only the carbonaceous material remains.

Achieving sufficient thickness is an important parameter because the amount of material captured is directly proportioned to the insertion sites available which is determined by the volume of material, i.e. both in terms of depth and width of carbonaceous material deposition. Since additional width of the frame detracts from the amount of battery active material surface available at the anode, it is desirable to keep the width of the frame deposit as narrow as possible without reducing dendrite scavaging capability to an ineffective level. Thus, the thickest possible layer commensurate with, but not thicker than the desired lithium anode plate thickness is preferred.

Most batteries are constructed using a stack of electrode plates that form a series of sequentially disposed anode/cathode combinations in the form of a thin sandwich. In totality, all the parallel connected anode plates of a cell or battery have individual carbonaceous material frames that act as dendrite scavaging sites for the cell/battery as a whole. Sites on one anode plate frame, of course, can tie up dendritic material originating anywhere in the cell or battery in accordance with the electrochemical activity occurring.

BRIEF DESCRIPTION OF THE DRAWINGS

In the drawings wherein like numerals are utilized to designate like parts throughout the same:

FIG. 1 is a plan view with parts cut away of an anode current collector of a mesh design with a border of solid substrate coated with carbonaceous in accordance with the invention;

FIG. 2 is a side elevation view of the anode current collector of FIG. 1; and

FIG. 3 is a sectional view taken along lines 3—3 of FIG. 1.

DETAILED DESCRIPTION

The figures illustrate a typical embodiment which utilizes a peripheral band or frame coating of carbonaceous material, preferably graphite, in accordance with the invention. It should be recognized that the anode can take any shape such as that of a cylinder or wound spiral and need not be a planar configuration as shown in the figures. Also, the carbonaceous coating may be located elsewhere if desired for a particular embodiment. Thus, the figures are intended only to illustrate the above invention only and are not intended as limiting with respect to the form of the electrode of the invention.

In this manner, FIG. 1 illustrates an anode electrode plate embodying an example of the present invention. The current collector shown as the underlayer at 10 and is the electronic conductor for the anode active material. It may be in the form of a mesh, expanded metal or other perforated-type construction, while other metals including stainless steel can be used, the substrates utilized in lithium anode batteries are generally of nickel. Lithium or other active electrochemical anode rechargeable metal material generally in foil form is pressed over one or both sides of the current collector as at 12 in normal fashion, after the carbonaceous peripheral frame is cured. The narrow, solid border area 14 that is susceptible of accepting a layer of deposited carbonaceous material, preferably graphite, which is designated at 16. The border area substrate is typically of solid foil, without the perforations or openings associated with the interior area of the current collector.

In the process of spray application, the center portion of the anode current collector grid 10 is masked to prevent the application of carbonaceous material coating in that area. Prior to spraying, the carbonaceous material powder is prepared as a slurry. One such preparation was composed of an amount of finely divided graphite powder, approximately 5% by weight of the graphite of a binder such as, for example, Kynar 461. In addition, a solvent such as methyl sulfoxide, for example, was added proportionally to about 350% by weight of the carbonaceous material/binder mix.

These ingredients are combined into a dilute slurry which is applied by spraying to the exposed edge surfaces of the current collector grid utilizing as many coats as desired to achieve the required thickness. Generally, the carbonaceous material frames around each collector grid are not thicker than the interior of the anode plates of which they are a part, thereby preserving the same electrode thickness across the entire plate. This assures uniform cell/battery electrode stack height when all plates are assembled. After the frame coatings are sprayed to the desired thickness, the finished border coated current collector grids, still without applied active material, are vacuum dried at 160° C. for a minimum of 4 hours.

Final operations of anode preparation include dye cutting the anode active material, generally lithium metal foil, and pressing it onto the grid portion of the current collector 10. In the case of anode plates which are assembled in a stacked arrangement, anode active material is pressed into both sides of the current collector, this embodiment is illustrated in the figures. In the case of a continuous spirally wrapped or other non-planar electrode package, both side of the current collector are again provided with the anode active material and the carbonaceous material anode border is also applied on both sides of the current collector, but more binder is involved in the composition to provide flexibility in the border material.

Rechargeable cells fabricated in accordance with the present invention have been tested utilizing lithium metal anodes and well-known metal oxide intercalation or insertion cathode electrode chemistry. It has been observed that the gray graphite borders functioning as scavengers of lithium dendrites turn a yellowish, green color after repeated cycling of the test cells.

Examples of these graphite borders after repeated cycling have been analyzed by a wet chemistry method to determine the percentage of lithium dendrite insertion introduced into the graphite structure. It has been determined on a weight basis that a full 25% increase in border weight has been realized by lithium dendrite insertion. The samples analyzed were taken from a cell which had been cycled more than 60 times and then terminated in the discharged state. This percentage would be expected to be even higher if the cell had been terminated in the charged state when maximum dendrite insertion is present.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself. For example, other materials capable of reversibly accepting the insertion of lithium in the structure of the material will perform the same function are contemplated.

What is claimed is:

1. An improved anode for use in active metal secondary cells comprising:
   a) an anode current collector;
   b) a layer of active metal anode material on at least one side of and in direct contact with said current collector; and
   c) a peripheral band on said at least one side of said current collector surrounding said layer of active metal anode material, said band comprising a material for accommodating reversible insertion of active metal crystallized material formed during cell charging.

2. The anode of claim 1 wherein the active metal anode material is lithium.

3. The anode of claim 1 wherein the band comprises a crystalline carbonaceous material.

4. The anode of claim 2 wherein the band comprises a crystalline carbonaceous material.

5. The anode of claim 3 wherein the crystalline carbonaceous material is graphite.

6. The anode of claim 4 wherein the crystalline carbonaceous material is graphite.

7. The anode of claim 1 comprising a layer of active metal anode material and a peripheral band applied to both sides of said current collector.

8. The anode of claim 7 wherein the peripheral bands comprise a crystalline carbonaceous material.

9. The anode of claim 8 wherein said crystalline carbonaceous material is graphite.

10. The anode of claim 7 comprising a plurality of current collectors.

11. The anode of claim 1 wherein said peripheral band is of a thickness essentially equal to that of said active metal anode material.

12. The anode of claim 7 wherein said peripheral band is of a thickness essentially equal to that of said active metal anode material.

13. An improved anode for use in active metal secondary cells comprising:
   (a) a plurality of substantially planar parallel connected anode current collectors;
   (b) a layer of lithium metal anode on each side of each of said current collectors; and
   (c) a peripheral frame on each side of each of said current collectors surrounding said lithium metal anode material wherein said frame comprises a material for accommodating reversible insertion of lithium crystallized material during cell charging.

14. The anode of claim 13 wherein said frame comprises a crystalline carbonaceous material.

15. The anode of claim 14 wherein said carbonaceous material is graphite.

16. The anode of claim 13 wherein said peripheral band is of a thickness essentially equal to that of said active metal anode material.

17. The anode of claim 16 wherein said peripheral band is of a thickness essentially equal to that of said active metal anode material.

18. A method of preventing dendrite shorts in a lithium metal anode active material, non-aqueous secondary cell having a layer of lithium on a current collector comprising the step of applying a peripheral band of insertion material for accommodating active metal insertion for dendrite abatement surrounding the anode active material.

19. The method of claim 18 wherein said insertion material is a crystalline carbon material.

* * * * *